(12) United States Patent
Kim et al.

(10) Patent No.: US 7,230,757 B2
(45) Date of Patent: Jun. 12, 2007

(54) LENTICULAR SHEET AND TRANSMISSION TYPE SCREEN USING THE SAME

(75) Inventors: Jong Hun Kim, Daejeon (KR); Sang Choll Han, Daejeon (KR); Deok Joo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 197 days.

(21) Appl. No.: 11/051,641

(22) Filed: Jan. 27, 2005

(65) Prior Publication Data

US 2005/0264880 A1  Dec. 1, 2005

(30) Foreign Application Priority Data

Jan. 30, 2004 (KR) .................. 10-2004-0006101

(51) Int. Cl.
  *G03B 21/60* (2006.01)
(52) U.S. Cl. .................................... 359/446
(58) Field of Classification Search ............. 359/456, 359/455, 457
  See application file for complete search history.

(56) References Cited

U.S. PATENT DOCUMENTS 5,870,224 A  2/1999 Saitoh et al.
6,862,139 B2 *  3/2005 Chang et al. ............... 359/453
2003/0174396 A1 *  9/2003 Murayama et al. ......... 359/453
2005/0117212 A1 *  6/2005 Kumagai et al. ........... 359/457

FOREIGN PATENT DOCUMENTS

JP         59121033       7/1984
JP         11-167168   *  6/1999 .................... 21/62

* cited by examiner

*Primary Examiner*—Rodney Fuller
*Assistant Examiner*—Robert Do
(74) *Attorney, Agent, or Firm*—McKenna Long & Aldridge LLP

(57) ABSTRACT

A lenticular sheet obtained by the method including forming lenticular lens section on the input side of the sheet; forming an irregular section having a plurality of depressions and protrusions on the output side of the sheet; forming a light-absorbing layer on each protrusion; and filling each depression with a light-transmittable resin. The lenticular sheet provides a tolerance needed for fine pitch pattern processing and can be manufactured by using a conventional printing process as it is, thereby providing excellent contrast characteristics as well as excellent moldability.

17 Claims, 5 Drawing Sheets

(a)

(b)

ND TRANSMISSION TYPE SCREEN USING THE SAME

LENTICULAR SHEET AND TRANSMISSION TYPE SCREEN USING THE SAME

TECHNICAL FIELD

The present invention relates to a lenticular sheet, a method manufacturing the same and a transmission type screen using the lenticular sheet. More particularly, the present invention relates to a lenticular sheet for microdisplay (MD), which can be manufactured by using a conventional printing process in forming a light-absorbing layer, and a transmission type screen using the above lenticular sheet.

BACKGROUND ART

In general, light sources used in projection TVs, etc., include projectors such as a compact CRT (Cathode Ray Tube), LCD (Liquid Crystal Display) and DLP (Digital Light Processing). Among those, light sources using compact display technology such as LCD and DLP are referred to as microdisplay (MD) type light sources. Transmission type screens are used for the above devices, wherein such a transmission type screen generally comprises a fresnel sheet and lenticular sheet. The lenticular sheet includes a cylindrical lens array, also referred to as a lenticular lens, on the input surface and/or output surface, and includes a light-absorbing layer disposed on the output surface in order to inhibit the reflection of external light.

To form such light-absorbing layers, printing processes have been generally used in conventional lenticular sheets for CRT screens. However, in the case of screens for MD, it is necessary to form a light-absorbing layer with high precision, because the pitch (width) of a lenticular lens is small to a degree of between several hundreds and several tens micrometers. Therefore, conventional printing processes were not applicable to lenticular sheets for MD. Additionally, in the case of a projection TV using an MD type light source, it is important to provide a sufficient degree of contrast to a screen, because the light source itself has insufficient contrast characteristics. In this regard, it is important to ensure a sufficient area of light-absorbing layer to the total area of the screen, as a primary means for providing sufficient contrast characteristics to the screen.

U.S. Pat. No. 5,870,224 or Japanese Laid-Open Patent No. Sho59-121033 suggests a method for producing a lenticular sheet for MD. In the method, photoresist having adhesive property is coated on the output surface of a lenticular sheet and parallel light is irradiated to the input surface of the lenticular sheet, so that the light collected on the surface of photoresist through an input lens causes the adhesion property of photoresist to be removed at the portions where the light is collected. Then, toner is coated on the surface of photoresist and parts of the toner, where the toner is not attached, are removed so that the toner can be attached only at the portions where the light is not collected, resulting in the formation of a light-absorbing layer. FIG. 7 shows a lenticular sheet 10 obtained by the above-described method. The above-described method has an advantage in that it allows a lenticular sheet 10 having a lenticular lens 13 with a fine pitch (width) to be easily manufactured, because the alignment of the lenticular lens 13 as an input lens and a light-absorbing layer 18 can be accomplished automatically during the manufacture of the lenticular sheet 10.

However, the above-described method has disadvantages that it needs additional processing steps including a step for coating photoresist, a step for irradiating light uniformly, a step for coating toner and a step for removing the toner, etc., thereby increasing the time and cost needed for the manufacture of a lenticular sheet compared to other conventional processes.

Moreover, the lenticular sheet manufactured by the above-described method has problems in that a light-absorbing layer having a sufficient area cannot be obtained, when the light collected on the photoresist layer 16 has aberration or is diffused by a light-diffusing so as to increase the area of a focus. Accordingly, the lenticular sheet should have a structure wherein a light-diffusing layer 12 is formed on the light-absorbing layer 18 (when viewed along the direction facing to a viewer). However, the above-mentioned structure increases the amount of light reflected toward the eyes of a viewer, because external light experiences diffusive reflection by the light-diffusing layer 12 before it is absorbed by the light-absorbing layer 18, and thus show a problem of degradation in contrast characteristics of the whole screen.

Further, when a light-absorbing layer is formed by means of the above-described method, the light-absorbing layer is not formed according to a predetermined design. On the contrary, the position and area of a light-absorbing layer are determined depending on the light collecting characteristics of a lenticular lens, characteristics of the photoresist or those of the light source used in forming the light-absorbing layer. Therefore, even if a designer skilled in the art wants to improve the contrast characteristics by increasing the area of a light-absorbing layer, designs on demand cannot be permitted.

DISCLOSURE OF THE INVENTION

The present invention has been made in view of the above-mentioned problems. It is an object of the present invention to provide a lenticular sheet having improved moldability and workability, which permits a light-absorbing layer to be formed by a conventional printing process, as it is, and can provide a sufficient tolerance needed for fine pitch pattern processing so that the arrangement of a light-absorbing layer can be controlled according to designer's demands, and a method for manufacturing the lenticular sheet.

It is another object of the present invention to provide a lenticular sheet having improved contrast characteristics and a manufacturing method thereof.

It is still another object of the present invention to provide a transmission type screen, which has improved moldability resulting from a sufficient tolerance needed for fine pitch pattern processing, in addition to improved contrast characteristics.

According to an aspect of the present invention, there is provided a lenticular sheet, which comprises a lenticular lens section having a plurality of cylindrical lenticular lens disposed at one side, and a light-transmittable irregular section having a plurality of protrusions and depressions and disposed at the other side, wherein each of the depressions of the irregular section is disposed in the position corresponding to a point on which a focus of each lenticular lens is formed, a light-absorbing layer is formed at the protrusions of the irregular section, and the depressions are filled with a light-transmittable resin.

According to the lenticular sheet of the present invention, the light-transmittable resin with which the depressions are filled and the light-transmittable material forming the irregular section preferably have similar refractive index values, and more preferably have the same refractive index. Preferably, materials forming both of the irregular section and the lenticular lens section are light-transmittable resins.

According to another aspect of the present invention, there is provided a method for manufacturing a lenticular sheet, which includes the steps of:

forming a light-transmittable sheet including a lenticular lens section having a plurality of cylindrical lenticular lens disposed at one side and a irregular section having a plurality of protrusions and depressions and disposed at the other side, wherein each of the depressions of the irregular section is disposed in the position corresponding to a point on which a focus of each lenticular lens is formed;

forming a light-absorbing layer on the protrusions of the irregular section; and filling the depressions of the irregular section with a light-transmittable resin.

According to the method for manufacturing a lenticular sheet of the present invention, the light-absorbing layer is formed first and then the depressions are filled with a light-transmittable resin. Particularly, because the portion where the light-absorbing layer is to be formed is provided in the form of protrusions, it is possible to form the light-absorbing layer only at the protrusions by using a simple process for treating the protrusions only, for example, by using a conventional printing process of coating black ink for the light absorption on the protrusions. Additionally, because the position and area of the protrusions can be determined with ease on designer's demands during the designing process of a lenticular sheet, it is possible to facilitate the formation of a light-absorbing layer, and thus to facilitate the manufacture of a lenticular sheet.

Hereinafter, the present invention will be explained in more detail.

In the lenticular sheet according to the present invention, the lenticular lens section and the irregular section may be formed integrally or separately. More particularly, when the lenticular lens section and the irregular section are formed integrally, the lenticular sheet is formed by using a light-transmittable resin. For example, the light-transmittable resin may be processed so as to provide the shape of a lenticular lens on one surface of the sheet and the shape of an irregular section on the other surface of the sheet. On the other hand, when the lenticular lens section and the irregular section are formed separately, a transparent substrate may be used. For example, the lenticular sheet may be manufactured by forming the lenticular lens section on one surface of the transparent substrate and forming the irregular section on the other surface of the transparent substrate.

To form the lenticular lens section and the irregular section, conventional methods may be used. It is apparent to those skilled in the art that suitable methods may be selected and applied, as necessary. Such methods include extrusion processes or photocuring processes.

In order to apply such extrusion or photocuring processes, a roll-shaped mold is manufactured first, wherein the mold has the opposite shape to that of the lenticular lens section or that of the irregular section having protrusions and depressions. Then, when an extrusion process is used, semi-cured resin is injected between two molds to complete molding. Meanwhile, when a photocuring process is used, uncured photocurable resin is injected between a transparent substrate and the mold, and light such as UV light is irradiated thereto through the transparent substrate to complete molding.

There is no particular limitation in methods for forming a light-absorbing layer on the protrusions of the irregular section obtained as described above. Any methods can be used with no limitation, as long as they permit materials having light absorption properties to be coated on the protrusions. Preferably, a printing processes may be used. Such printing processes include conventionally known printing processes such as a screen printing process, a printing processes using heat transfer ribbons, a gravure printing process, etc. In order to form a light-absorbing layer, it is preferable to use black ink having excellent light dissipation property.

The depressions are filled with a light-transmittable resin having a refractive index that is similar to or the same as the refractive index of the light-transmittable material forming the irregular section. The difference between both refractive index values is preferably 0.1 or less. More preferably, both refractive index values are the same to facilitate the manufacture of a lenticular sheet. Particularly, it is preferable that the light-transmittable resin is forced to be in completely close contact with the depressions so as to prevent the formation of an air layer between the depression and the light-transmittable resin section. The phrase, "completely close contact" means a state wherein any low refractive layer such as air layer is not present between the depressions and the light-transmittable resin with which the depressions are filled.

Hereinafter, the light-transmittable material forming the irregular section is referred to as "a first light-transmittable resin", and the section formed by the first light-transmittable resin is referred to as "a first light-transmittable resin section". Additionally, the light-transmittable material with which the depressions are filled is referred to as "a second light-transmittable resin", and the depressions filled with the second light-transmittable resin are referred to as "a second light-transmittable resin section". In addition, the lenticular lens section, when it is formed integrally together with irregular section as well as when is formed separately, is preferably formed of the first light-transmittable resin.

There is no particular limitation in forming the second light-transmittable resin section by filling the depressions with the second light-transmittable resin. However, it is important that the resin is forced to be in completely close contact with the inner wall of the depressions so that low refractive layers such as an air layer cannot be formed between the second light-transmittable resin section and the depressions. Particular examples of such methods for forming the second light-transmittable resin section include a photocuring process. Particularly, in a series of processing steps for manufacturing a lenticular sheet, lenticular lens section and an irregular section are formed, and followed by the formation of a light-absorbing layer, and then the depressions are filled with a photocurable resin. Next, light such as UV light is irradiated thereto to cure the photocurable resin. More particularly, after the photocurable resin is introduced, light is irradiated to the resin from the surface opposite thereto while the resin is in close contact with a flat roll, etc., thereby forming the second light-transmittable resin section at the depressions.

Meanwhile, a lenticular sheet may be provided with a protection filter having diffusion property. For example, as a protection filter, a transparent protection sheet having diffusion property such as an acrylic sheet, acrylic/styrene copolymer sheet (MS sheet) or glass is disposed at the outside of the irregular section. Then, a photocurable and light-transmittable resin is introduced between the protection filter and the depressions and then the resin is cured to form the second light-transmittable resin section simultaneously completing the adhesion of the protection filter to the lenticular sheet. Otherwise, after forming the lenticular sheet, the second light-transmittable resin may be used in a step of laminating the protection filter with the lenticular sheet as adhesive.

Each of the depressions is a point on which light collected by the lenticular lens is focused. As shown in FIGS. 3a, 3b and 4, light is scattered after the formation of a focus. Particularly, when the depressions are filled with air only without any additional treatment, the light transmitted by the first light-transmittable resin section is refracted and the radius of the light flux transmitted by a final output surface 260' is very large, as shown in FIG. 3b. As a result, the area of depressions should be increased, and thus the acceptable tolerance in a manufacturing process decreases. Additionally, when the refractive index difference between the irregular section and the medium inside of each depression is high, the light transmitted by the first light-transmittable resin section is refracted. More particularly, when each of the depressions has a different depth, refracted light follows a different path, resulting in variation in the position of a focus. Accordingly, it is difficult to predict the radius of light flux when light is transmitted by the depressions and then transmitted by the final output surface, and thus it is also difficult to determine the area of a light-absorbing area. For this reason, the depth of each depression should be contemplated in order to determine the position of a light-absorbing layer precisely. Therefore, work efficiency in a manufacturing process decreases. Moreover, when the area of each depression is increased so as to ensure a sufficient tolerance, the area of a light-absorbing layer decreases accordingly. Since the contrast characteristics of a screen is improved in proportion to the ratio of a light-absorbing layer to the screen, such a decreased area of the light-absorbing layer deteriorates the contrast characteristics.

According to the present invention, the above-mentioned problem is solved by filling the depressions with a light-transmittable resin. When the first light-transmittable resin forming the irregular section and the second light-transmittable resin with which the depressions are filled have a similar or the same refractive index, it is possible to predict the radius of the light flux transmitted by the lenticular lens, then transmitted by the depressions and by the final output surface 260'. Additionally, when compared to a lenticular sheet having depressions filled with air, the radius of the light flux transmitted by the final output surface 260' of the present invention is smaller, and accordingly, it is possible to increase the area of a light-absorbing layer, thereby providing excellent contrast characteristics. As a result, in the case of providing the same area of light-absorbing layer, the lenticular sheet according to the present invention can ensure an acceptable tolerance to a higher degree, compared to a lenticular sheet having depressions filled with air, thereby providing excellent processabilty, workability and moldability.

Further, because the refractive index of the second light-transmittable resin is generally greater than that of air, light diffusion is accomplished when the light transmitted by the second light-transmittable resin propagates into the air (see FIG. 3a), thereby providing better screen quality.

It is preferable that the depressions are completely filled with the second light-transmittable resin so that the second light-transmittable resin can reach the light-absorbing layer. In the step for forming the second light-transmittable resin section by filling the depressions with the resin, the second light-transmittable resin may be filled up and coated even on the top of the light-absorbing layer so that the second light-transmittable resin section can form the output surface of the lenticular sheet.

Whether the lenticular lens section and the irregular section are formed integrally or not, the lenticular lens section and the irregular section may be formed of the same light-transmittable resin. Additionally, the second light-transmittable resin section may also be formed of the same resin. The resin may have a light diffusion property. If desired, the resin further comprises a diffusing agent.

Any resins can be used as the light-transmittable resin according to the present invention, as long as resins are capable of light transmission and have moldabilty. Particular non-limiting examples of the light-transmittable resin include acrylic resins such as urethane acrylate, epoxy acrylate, ester acrylate resins and acrylic resins obtained by mixing at least two of them.

Further, the present invention provides a transmission type screen comprising a fresnel lens and the lenticular sheet according to the present invention.

BEST MODE FOR CARRYING OUT THE INVENTION

Hereinafter, the lenticular sheet, manufacturing method thereof and transmission type screen according to the present invention will be described in detail referring to the accompanying drawings, and thus a person skilled in the art may be able to carry out the present invention.

Figure 1:
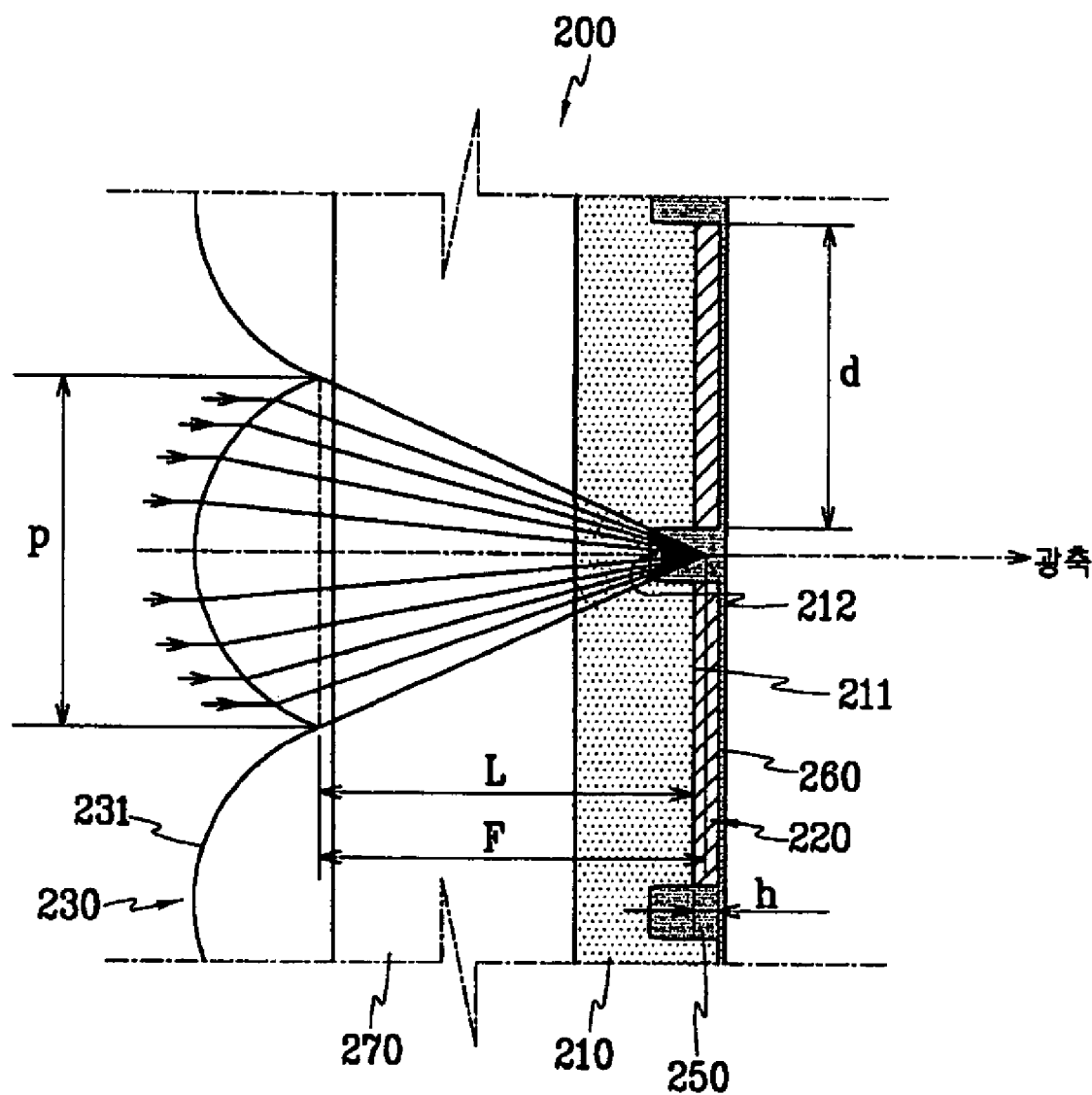
FIG. 1 is a schematic view showing the lenticular sheet according to a preferred embodiment of the present invention.

Referring to FIG. 1, the lenticular sheet according to a preferred embodiment of the present invention will be explained hereinafter.

The lenticular sheet 200 is provided with a cylindrical lenticular lens array 230 facing to the input surface on a transparent substrate 270. Each cylindrical lenticular lens 231 forming the lenticular lens array 230 has a size (width) corresponding to the size of the minimum pixel that can be displayed by a projection TV. In the case of a lenticular lens for microdisplay, it has a width P of between several hundreds and several tens micrometers. The lenticular lens that may be used in the present invention includes a lenticular lens formed by using acrylic resins.

The lenticular sheet 200 includes, toward the output surface, a first light-transmittable resin section 210, which is disposed on the substrate 270 and has an irregular shape formed of a plurality of depressions 212 and protrusions 211. Each depression 212 of the first light-transmittable resin section 210 is disposed at a point on which a focus of each lenticular lens 231 of the lens array 230 is formed. In order to form the irregular shape formed of depressions and protrusions, a photocuring process may be preferably used.

The number and interval of the depressions and protrusions are adjusted depending on the number and width of lenticular lenses.

On the top of the protrusions 211 of the first light-transmittable resin section 210, a light-absorbing layer 220 is formed, preferably by using black ink, according to a conventional printing process. In the depressions 212 of the first light-transmittable resin section 210, a second light-transmittable resin section 250 is formed, thereby providing a final output surface 260 of the lenticular sheet. Particularly, the second light-transmittable resin section 250 may be filled even up to the top of the light-absorbing layer 220 so as to form the final output surface 260. Otherwise, the second light-transmittable resin section 250 may be filled only in the depressions 212 of the first light-transmittable resin section 210 so that its height may be the same as the height of the light-absorbing layer 220. Preferably, the first light-transmittable resin and the second light-transmittable resin are the same so that the refractive index values of the first and the second light-transmittable resin sections 210 and 250 may be equalized.

The depressions 212 of the first light-transmittable resin section 210 are in completely close contact with the second light-transmittable resin section 250 so as to prevent the formation of an air layer, etc. between them.

In order to form the second light-transmittable resin section in the depressions, a photocuring process may be preferably used. Particularly, the depressions are filled with a second light-transmittable resin in the uncured state and then the resin is cured to form the second light-transmittable resin section. In addition, the first light-transmittable resin section 210 and the second light-transmittable resin section 250 may be formed by using a resin having light diffusion property so as to avoid a need for the formation of a separate light-diffusing layer.

Meanwhile, the ratio of the width d of the light-absorbing layer 220 to the width P of each lenticular lens 231 is preferably $d/p \geq 0.6$, and more preferably $d/p \geq 0.8$. In other words, the light-absorbing layer 220 comprises at least 60%, preferably at least 80% of the total area of the lenticular sheet 200 so that the contrast characteristics can be improved.

Figure 2:
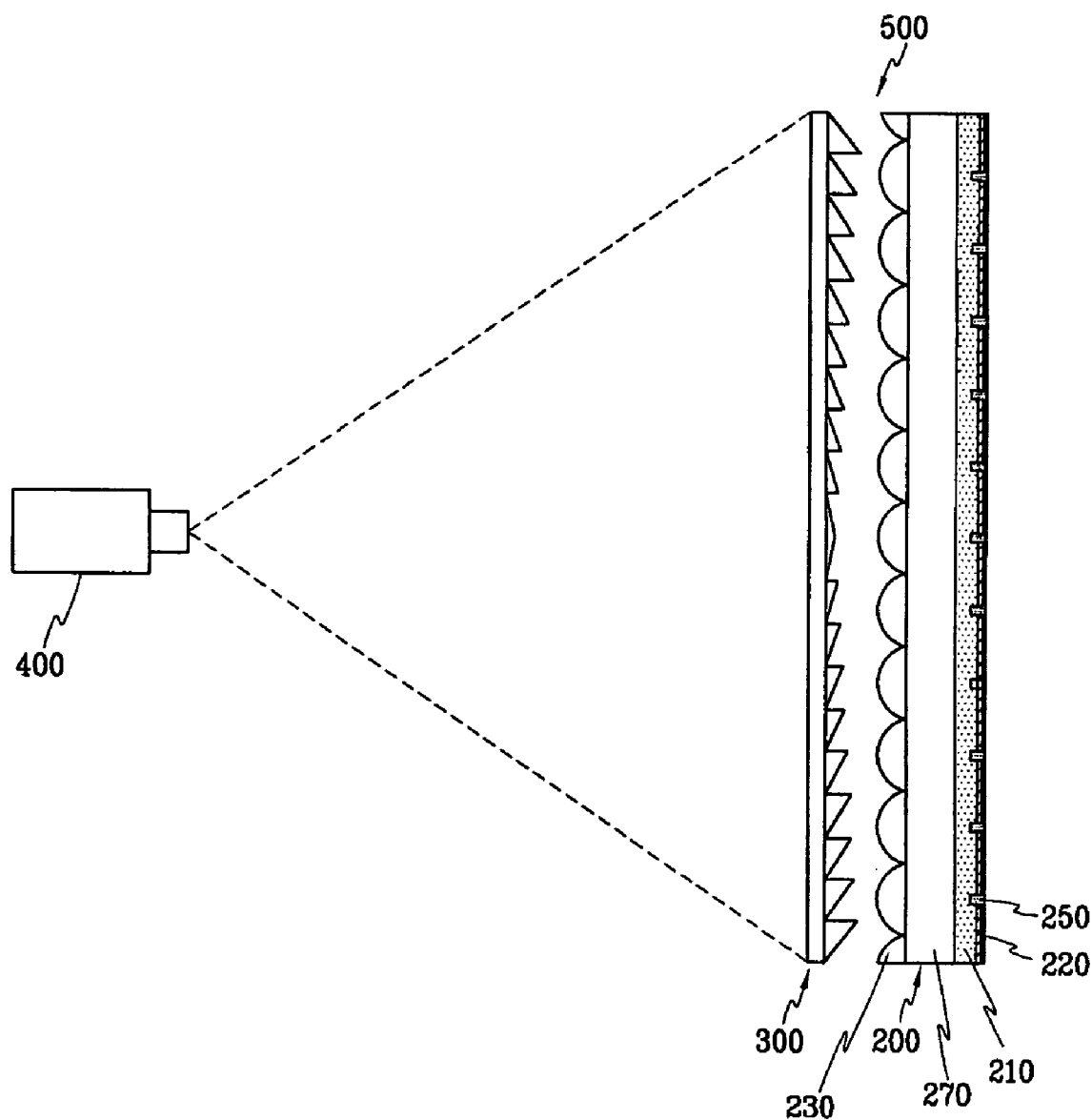
FIG. 2 is a schematic view showing the transmission type screen according to the present invention.

Referring to FIG. 2, the transmission type screen 500 using the lenticular sheet 200 as shown in FIG. 1 comprises a fresnel lens 300 and the lenticular sheet 200.

The fresnel lens 300 is one that takes the shape of a thin sheet obtained by dividing a thick lens into concentric bands and has all of the optical characteristics of the original lens. The fresnel lens 300 serves to convert beams radiated from a light source 400 into substantially parallel beams when the radiated beams pass through the fresnel lens 300.

Therefore, an image projected from the light source 400 forms image pixels in the depressions 212 of the first light-transmittable resin section 210 by means of the fresnel lens 300 and the lenticular lens array 230 of the lenticular sheet 200. Particularly, when the refractive index values of the first light-transmittable resin section 210 and the second light-transmittable resin section 250 are the same, a focus can be formed with no refraction at the interface.

Figure 3:
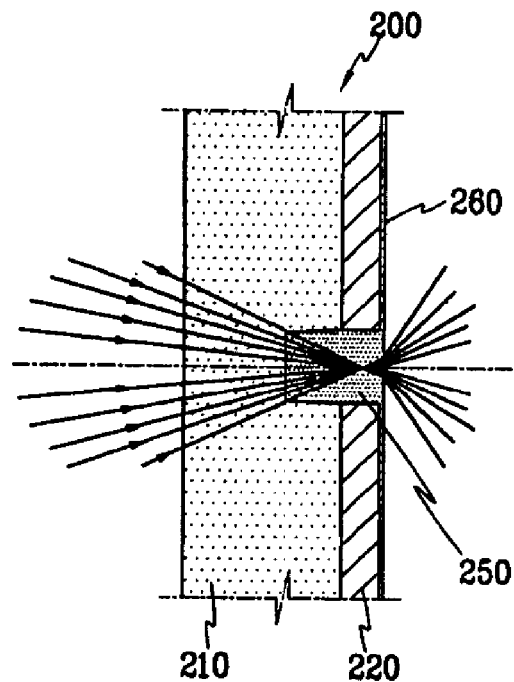
FIGS. 3a and 3b are schematic views each illustrating the size of beam radius of outputted light flux depending on the presence of a second light-transmittable resin layer.
Figure 3:
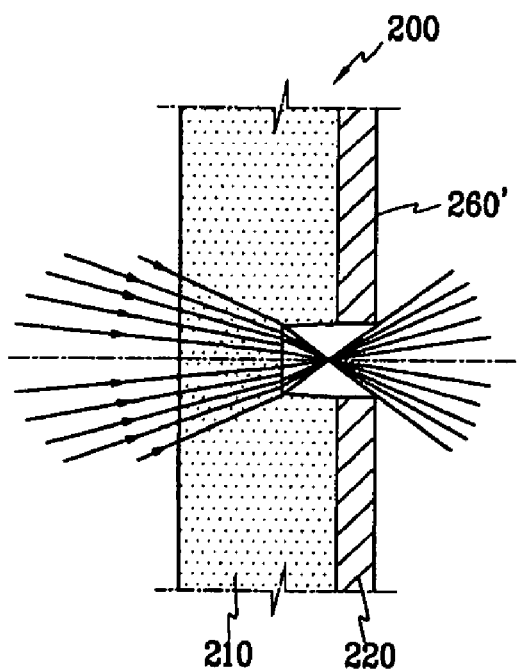

FIG. 3a shows the lenticular sheet according to an embodiment of the present invention, in which the first light-transmittable resin section 210 and the second light-transmittable resin section 250 have the same refractive index. FIG. 3b shows the lenticular sheet that is not provided with the second light-transmittable resin section. When the same light flux are inputted, the lenticular sheet 200 that comprises the first light-transmittable resin section 210 and the second light-transmittable resin section 250 having the same refractive index, provides a relatively small radius of the light flux transmitted by the final output surface 260, as shown in FIG. 3a. On the other hand, the lenticular sheet that is not provided with the second light-transmittable resin section, provides a large radius of the light flux transmitted by the final output surface 260', as shown in FIG. 3b. Accordingly, when the second light-transmittable resin section is not formed as shown in FIG. 3b, the acceptable tolerance (aligning tolerance) decreases, thereby complicating the manufacturing process of a lenticular sheet.

Additionally, when the second light-transmittable resin section is not formed as shown in FIG. 3b, the position of a focus may be varied depending on the depth of each depression, resulting in variations in the radius of the light flux transmitted by the depressions and the final output surface. Therefore, the depth of each depression should be contemplated in the manufacturing process of a lenticular lens. However, the area of depressions should be restricted in order to increase the area of a light-absorbing layer and to ensure a sufficient light-absorbing layer. And thus in this case, the position of depressions and protrusions should be strictly controlled so as to allow the light transmitted by the lenticular lens to transmit through the final output surface with no problems. Under these circumstances, when the radius of light flux is unpredictable or relatively broad, it is unavoidable that the aligning tolerance in arrangement of the depressions and protrusions decreases, resulting in degradation of workability.

As used herein, the term "tolerance" is defined as follows. For the purpose of transmitting the light collected by a lenticular lens through a final output surface perfectly, the lenticular lens and the depressions must be aligned. However, it is acceptable that the position of lenticular lens and that of the center of depressions have a common difference from their correctly aligned state in a practical process. Such an acceptable difference is referred to as an aligning tolerance.

According to the present invention using the second light-transmittable resin section, it is possible to avoid the problem as described above. Therefore, assuming that the area of light-absorbing layers is the same in both cases, the lenticular sheet according to the present invention can ensure a sufficient aligning tolerance on an optical axis and provide excellent workability, compared to the lenticular sheet that is not provided with the second light-transmittable resin section.

Figure 4:
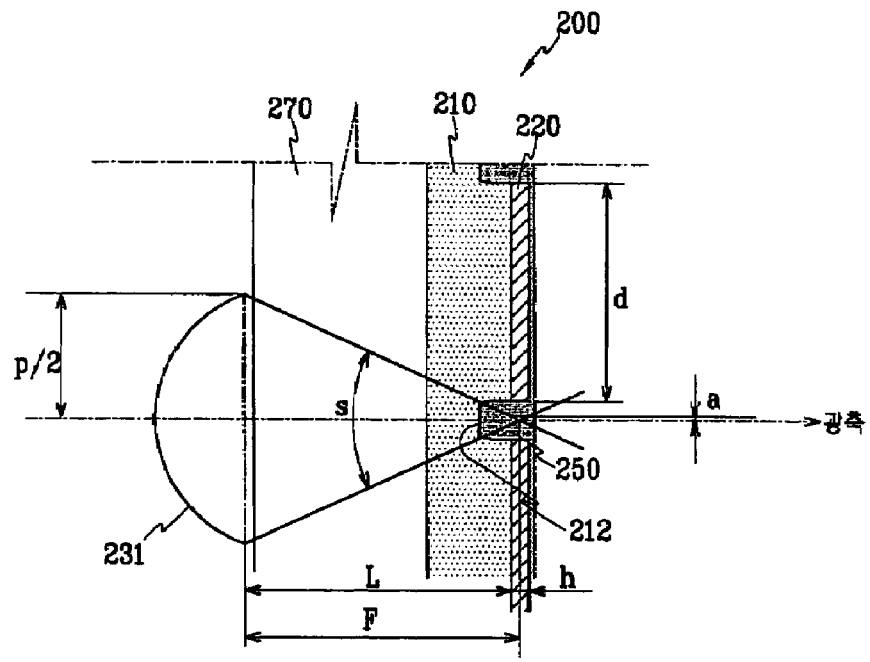
FIG. 4 is a detailed view illustrating how to calculate a tolerance on the optical axis.

FIG. 4 shows a detailed view illustrating how to calculate an aligning tolerance on an optical axis. The width of depressions 212 disposed on the output side of the lenticular sheet is equal to the difference between the width P of each lenticular lens 231 and the width d of the light-absorbing layer 220, i.e., P−d. When the focus of the lenticular lens 231 is present correctly on the mid-point (½) of the thickness h of the light-absorbing layer 220, the half-width "a" of the maximum light flux at the start point of the light-absorbing layer 220 is defined by the formula of $$a = \frac{h}{2}\tan\frac{s}{2},$$

wherein s is a focusing angle, F is the distance from the straight line connecting both end points of the lenticular lens 231 to the focus, P is the width of the lenticular lens 231, and h is the thickness of the light-absorbing layer 220. In the above formula, tan(s/2)=P/2F, and thus $$a = \frac{hP}{4F}.$$

Therefore, the aligning tolerance $T_{op}$ on the optical axis is represented by the following formula 1:

$$T_{op} = \pm\left(\frac{P-d}{2} - \frac{hP}{4F}\right) \quad \text{[formula 1]}$$

Meanwhile, when the optical axis of the lenticular lens 231 is aligned correctly at the center of each depression 212, the tolerance $T_t$ to the thickness of the lenticular sheet 200 is represented by the following formula 2:

$$T_t = \pm\left(F - \frac{h}{2} - \frac{dF}{P}\right) \quad \text{[formula 2]}$$

Figure 5:
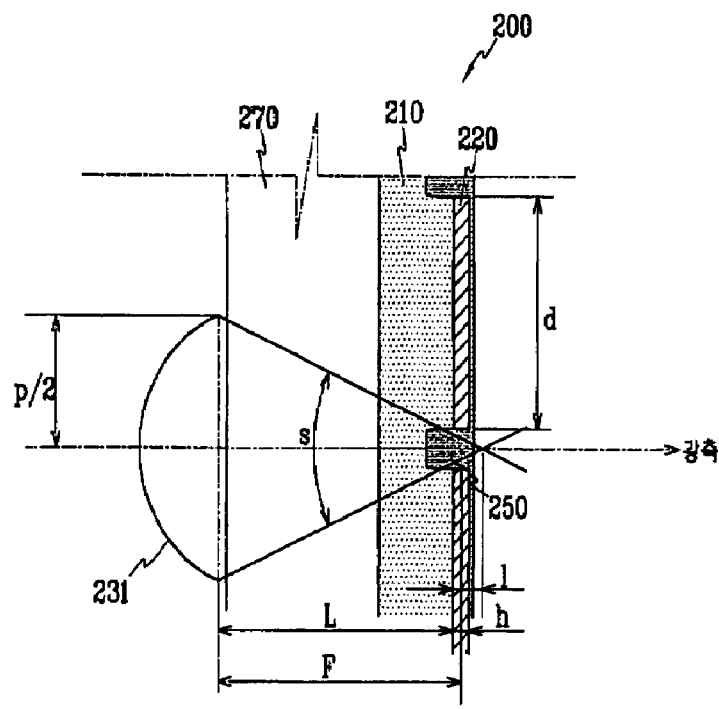
FIGS. 5 and 6 are detailed views each showing a lenticular sheet having a thickness larger than or smaller than the reference thickness.

Therefore, the range of distance F depending on lens thickness (distance from the straight line connecting both end points of each lenticular lens 231 to the focus) can be obtained from the above formulae. When the lenticular sheet 200 has a thickness smaller than that of the reference thickness, the focus of the lenticular lens 231 is formed on a point beyond the final output surface 260, as shown in FIG. 5. More particularly, the distance 1 from the interface between the first light-transmittable resin section 210 and the light-absorbing layer 220 to the focus is defined by the formula of $$l = \frac{\frac{P-d}{2}}{\tan\frac{s}{2}} = \frac{(P-d)F}{P}.$$

Additionally, when the distance from both end points of the lenticular lens 231 to the interface between the first light-transmittable resin section 210 and the light-absorbing layer 220 is represented by L, since F≦L+1, resulting in the following formula 3:

$$F \leq \frac{PL}{d} \quad \text{[formula 3]}$$

Figure 6:
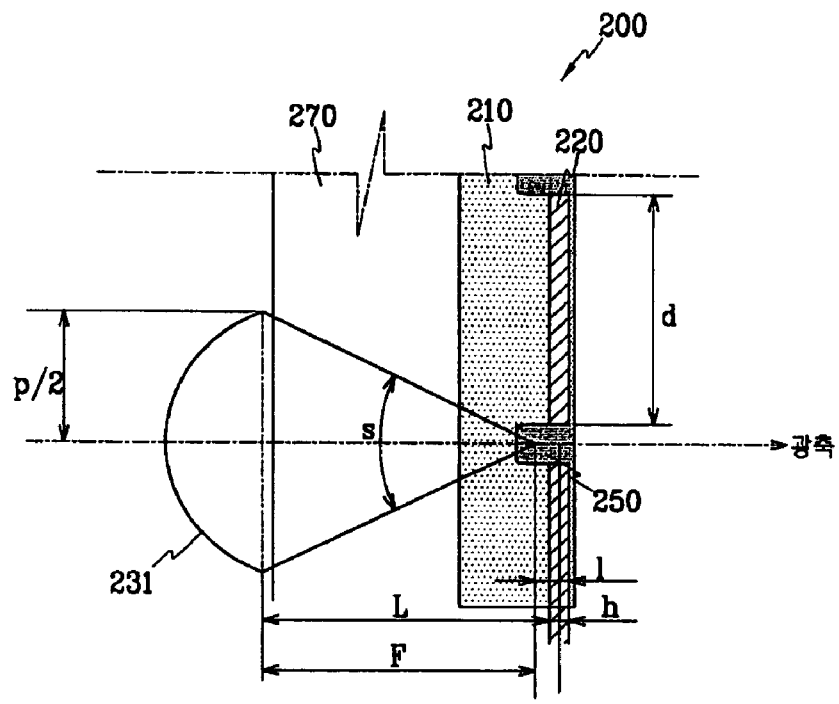
Figure 7:
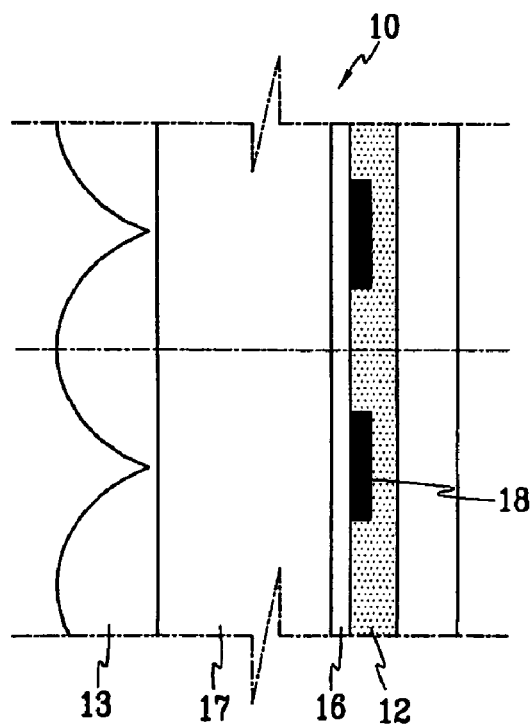
FIG. 7 is a schematic view showing a conventional lenticular sheet.

In another embodiment, when the lenticular sheet 200 has a thickness greater than that of the reference thickness, the focus of the lenticular lens 231 is formed under the staring point of the light-absorbing layer 220, as shown in FIG. 6. In this case, since F≧L+h−1, resulting in the following formula 4:

$$F \geq \frac{L+h}{1 + \frac{P-d}{P}} = \frac{P(L+h)}{2P-d} \quad \text{[formula 4]}$$

Accordingly, F satisfies the following formula 5 from the above formulae 3 and 4:

$$\frac{P(l+h)}{2P-d} \leq F \leq \frac{PL}{d} \quad \text{[formula 5]}$$

As can be seen from the foregoing, if F, i.e., the distance from the straight line connecting both end points of each lenticular lens 231 to the focus satisfies a specific range defined by formula 5, F does not adversely affect the quality of a lenticular sheet, and therefore, a lenticular sheet can be manufactured with a sufficient tolerance.

More preferably, F, i.e., the distance from the straight line connecting both end points of each lenticular lens to the focus satisfies the formula of L≦F≦L+h from the range defined by formula 5.

For reference, a method for calculating an acceptable tolerance on an optical axis will be explained hereinafter.

The lenticular sheet used in this method was manufactured as follows. The width P of each lenticular lens was 255 μM. The distance from the straight line connecting both end points of each lenticular lens to the focus, i.e., F was 269.4 μm. The light-absorbing layer had a thickness h of 20 μm and a width d of 216.8 μm. In the lenticular sheet, the lenticular lens and the first light-transmittable resin section had a refractive index of 1.53. Further, a transparent substrate having a refractive index of 1.67 was used. When the focus of the lenticular lens is disposed toward a light source from the mid-point (½) of the thickness of the light-absorbing layer, i.e., when the lenticular lens becomes thick, the following formula 6 was used to obtain a tolerance on the optical axis:

$$T_{op} = \pm\left(\frac{P-d}{2} - \frac{(L+h-F)P}{2F}\right) \quad \text{[formula 6]}$$

Meanwhile, when the focus of the lenticular lens is disposed toward a viewer from the mid-point (½) of the thickness of the light-absorbing layer, i.e., when the lenticular lens becomes thin, the following formula 7 was used to obtain a tolerance on the optical axis:

$$T_{op} = \pm\left(\frac{P-d}{2} - \frac{(F-L)P}{2F}\right) \quad \text{[formula 7]}$$

The following Table 1 shows the results of the acceptable tolerance on the optical axis depending on the total thickness of a lenticular sheet.

TABLE 1

| Thickness (mm) | L(mm) | Acceptable Tolerance(±) (mm) |
|---|---|---|
| 0.360 | 0.249 | 0.010 |
| 0.365 | 0.254 | 0.012 |
| 0.370 | 0.259 | 0.014 |
| 0.375 | 0.264 | 0.012 |
| 0.380 | 0.269 | 0.010 |
| 0.385 | 0.274 | 0.007 |
| 0.390 | 0.279 | 0.005 |
| 0.395 | 0.284 | 0.003 |
| 0.400 | 0.289 | 0.000 |

As shown in Table 1, when the lenticular sheet is formed to have a thickness of 0.370 mm, the acceptable tolerance on the optical axis is maximized. In addition to the above thickness of a lenticular sheet, other variables such as refractive index of a light-transmittable resin, focus distance of a lenticular lens, etc., may be adjusted to control the acceptable tolerance. Each characteristic value can be optimized so as to obtain the maximized acceptable tolerance.

As described above, according to the present invention, a light-absorbing layer can be formed by means of a relatively simple process used conventionally, such as a printing process. Additionally, a designer can determine the area of a light-absorbing layer on demand. Therefore, contrast characteristics can be ensured by realizing a sufficient area of light-absorbing layer in a simple manner. However, according to the prior art using a light irradiation process with a photoresist, the area of a light-absorbing layer is determined depending on processing variables such as types and characteristics of light sources used in forming the light-absorbing layer, characteristics of the optically reactive photoresist such as reactivity and sensitivity, stability of manufacturing equipments. Therefore, a designer cannot determine the area of a light-absorbing layer freely. Compared to this, the area of a light-absorbing layer can be easily determined, for example, by a preformed mold, according to the present invention. Further, the present invention can ensure an aligning tolerance to the highest degree by virtue of the second light-transmittable resin layer filled in the depressions, and a problem of lack of auto-aligning of an optical axis during the process is also solved.

INDUSTRIAL APPLICABILITY

As can be seen from the foregoing, the lenticular sheet and transmission type screen according to the present invention have excellent contrast characteristics and provide a tolerance needed for fine pitch pattern processing. Therefore, the lenticular sheet can be formed by using a conventional printing process as it is. As a result, the manufacturing method of a lenticular sheet according to the present invention has simple processing steps and is cost- and time-efficient so that it can be applied to lenticular sheets for microdisplay.

The invention claimed is:

1. A lenticular sheet, which comprises a lenticular lens section having a plurality of cylindrical lenticular lens disposed at one side, and a light-transmittable irregular section having a plurality of protrusions and depressions and disposed t the other side, wherein each of the depressions of the irregular section is disposed in the position corresponding to a point on which a focus of each lenticular lens is formed, a light-absorbing layer is formed at the protrusions of the irregular section, and the depressions of the irregular section are filled with a light-transmittable resin, thereby forming a light-transmittable resin section;

wherein a distance F from a straight line connecting both end points of each lenticular lens to a focus of each lenticular lens satisfies the relation of $$\frac{P(L+h)}{2P-d} \leqq F \leqq \frac{PL}{d},$$

wherein P is the width of a lenticular lens; L is the distance from a straight line connecting both end points of each lenticular lens to the protrusions of the irregular section; h is the thickness of the light-absorbing layer; and d is the width of the protrusions of the irregular section.

2. The lenticular sheet according to claim 1, wherein inner wall of each depression is in completely close contact with the light-transmittable resin section disposed in the depressions.

3. The lenticular sheet according to claim 1, wherein the difference between the refractive index of light-transmittable material forming the light-transmittable irregular section and that of the light-transmittable resin section disposed in the depressions is 0.1 or less.

4. The lenticular sheet according to claim 1, wherein the light-absorbing layer and the light-transmittable resin section disposed in the depressions the light-absorbing layer are further provided with a light-difussing layer disposed on the side toward a viewer.

5. The lenticular sheet according to claim 1, wherein the irregular section and the light-transmittable resin section disposed in the depressions have light diffusion property.

6. The lenticular sheet according to claim 1, wherein the light-transmittable resin section disposed in the depressions extends to the top of the light-absorbing layer.

7. The lenticular sheet according to claim 1, wherein a transparent substrate is disposed between the lenticular lens section and the irregular section.

8. The lenticular sheet according to claim 1, wherein the distance F from the straight line connecting both end points of each lenticular lens to the focus of each lenticular lens satisfies the relation of $L \leqq F \leqq L+h$.

9. The lenticular sheet according to claim 1, wherein the irregular section and the light-transmittable resin section disposed in the depressions are formed of the same polymer resin.

10. The lenticular sheet according to claim 1, wherein the ratio of the width d of the light-absorbing layer to the width P of each lenticular lens satisfy the relation of $d/P \geqq 0.6$.

11. The lenticular sheet according to claim 10, wherein the ratio of the width d of the light-absorbing layer to the width P of each lenticular lens in the lens array section satisfy the relation of $d/P \geqq 0.8$.

12. A method for manufacturing a lenticular sheet, which includes the steps of:

forming a light-transmittable sheet comprising a lenticular lens section having a plurality of cylindrical lenticular lens disposed at one side, and an irregular section having a plurality of protrusions and depressions and disposed at the other side, wherein each of the depressions of the irregular section is disposed in the position corresponding to a point on which a focus of each lenticular lens is formed;

forming a light-absorbing layer on the protrusions of the irregular section; and filling the depressions of the irregular section with a light-transmittable resin;

wherein a distance F from a straight line connecting both end points of each lenticular lens to a focus of each lenticular lens satisfies the relation of $$\frac{P(L+h)}{2P-d} \leq F \leq \frac{PL}{d},$$

wherein P is the width of a lenticular lens; L is the distance from a straight line connecting both end points of each lenticular lens to the protrusions of the irregular section; h is the thickness of the light-absorbing layer; and d is the width of the protrusions of the irregular section.

13. The method according to claim 12, wherein the light-absorbing layer is formed by using a printing process.

14. The method according to claim 12, wherein the step of filling the depressions comprises filling the depressions with a photocurable resin, and irradiating light thereto to cure the photocurable resin.

15. The method according to claim 12, wherein the light-transmittable resin is filled and coated up to the top of the light-absorbing layer, in the step of filling the depressions with the light-transmittable resin.

16. The method according to claim 12, wherein the step of forming the light-transmittable sheet comprises forming a plurality of cylindrical lenticular lenses on one side of a transparent substrate, and forming the irregular section having a plurality of depressions and protrusions on the other side of the transparent substrate.

17. A transmission type screen comprising a fresnel lens and a lenticular sheet, characterized in that the lenticular sheet comprises a lenticular lens section having a plurality of cylindrical lenticular lens disposed at one side, and a light-transmittable irregular section having a plurality of protrusions and depressions and disposed at the other side, wherein each of the depressions of the irregular section is disposed in the position corresponding to a point on which a focus of each lenticular lens is formed, a light-absorbing layer is formed at the protrusions of the irregular section, and the depressions of the irregular section are filled with a light-transmittable resin, thereby forming a light-transmittable resin section;

wherein a distance F from a straight line connecting both end points of each lenticular lens to a focus of each lenticular lens satisfies the relation of $$\frac{P(L+h)}{2P-d} \leq F \leq \frac{PL}{d},$$

wherein P is the width of a lenticular lens; L is the distance from a straight line connecting both end points of each lenticular lens to the protrusions of the irregular section; h is the thickness of the light-absorbing layer; and d is the width of the protrusions of the irregular section.

* * * * *